(12) United States Patent
Kuehnle et al.

(10) Patent No.: US 9,689,463 B2
(45) Date of Patent: Jun. 27, 2017

(54) ROLLER FOR A PENDULUM MASS OF A CENTRIFUGAL FORCE PENDULUM

(71) Applicant: Schaeffler Technologies AG & Co. KG, Herzogenaurach (DE)

(72) Inventors: Michael Kuehnle, Buehl (DE); Peter Wahl, Woehrt-Maximiliansau (DE); Stephan Maienschein, Baden-Baden (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 77 days.

(21) Appl. No.: 14/414,439

(22) PCT Filed: Jul. 30, 2013

(86) PCT No.: PCT/DE2013/200080
§ 371 (c)(1),
(2) Date: Jan. 12, 2015

(87) PCT Pub. No.: WO2014/019582
PCT Pub. Date: Feb. 6, 2014

(65) Prior Publication Data
US 2015/0167778 A1    Jun. 18, 2015

(30) Foreign Application Priority Data
Jul. 31, 2012    (DE) .................. 10 2012 213 501

(51) Int. Cl.
*F16F 15/14*    (2006.01)
*F16D 13/70*    (2006.01)
(Continued)

(52) U.S. Cl.
CPC ............ *F16F 15/145* (2013.01); *F16D 13/70* (2013.01); *F16F 15/31* (2013.01);
(Continued)

(58) Field of Classification Search
CPC . F16F 15/145; F16F 15/31; F16D 2021/0615; Y10T 74/2128
See application file for complete search history.

(56) References Cited

U.S. PATENT DOCUMENTS

| 2,079,226 A | 5/1937 | Sarazin |
|---|---|---|
| 2002/0046623 A1 | 4/2002 | Carlson et al. |

(Continued)

FOREIGN PATENT DOCUMENTS

| DE | 19911562 | 9/2000 |
|---|---|---|
| DE | 102009042804 | 6/2010 |

(Continued)

*Primary Examiner* — Jacob S Scott
*Assistant Examiner* — Lillian Nguyen
(74) *Attorney, Agent, or Firm* — Davidson, Davidson & Kappel, LLC

(57) ABSTRACT

A roller (20) for a pendulum mass (4, 5, 6) of a centrifugal force pendulum (1), including a rolling section (42), a first maintaining section (26) and a second maintaining section (27). The maintaining sections have a larger diameter than the rolling section, and the roller (20) has a width (44) which is smaller or the same size as the first depth (9) of the centrifugal force pendulum. Due to roller (20), a centrifugal force pendulum can be constructed for particularly flat couplings. In particular, the total weight of the friction clutch is reduced and the mounting is simplified.

10 Claims, 4 Drawing Sheets

(51) Int. Cl.
*F16F 15/31* (2006.01)
*F16D 21/06* (2006.01)

(52) U.S. Cl.
CPC .............. *F16D 2013/703* (2013.01); *F16D 2021/0615* (2013.01); *Y10T 74/2128* (2015.01); *Y10T 74/2132* (2015.01)

(56) References Cited

U.S. PATENT DOCUMENTS

| | | | | |
|---|---|---|---|---|
| 2006/0289263 | A1* | 12/2006 | Friedmann | F16D 13/58 192/48.8 |
| 2007/0246319 | A1* | 10/2007 | Ploetz | F16D 41/067 192/45.1 |
| 2009/0000589 | A1 | 1/2009 | Weinzierl et al. | |
| 2011/0214532 | A1* | 9/2011 | Kirchner | F16D 13/75 74/665 A |
| 2011/0314957 | A1* | 12/2011 | Krause | F16F 15/121 74/574.2 |
| 2012/0055281 | A1* | 3/2012 | Huegel | F16F 15/145 74/574.2 |
| 2012/0255394 | A1 | 10/2012 | Maienschein | |

FOREIGN PATENT DOCUMENTS

| | | | | |
|---|---|---|---|---|
| DE | 102010049556 | | 5/2011 | |
| DE | 102010049930 | | 5/2011 | |
| DE | 102013210043 | A1 * | 12/2013 | ............ F16F 15/145 |
| EP | 2282078 | | 2/2011 | |
| FR | 1000629 | | 2/1952 | |
| WO | WO2011076169 | | 6/2011 | |

\* cited by examiner

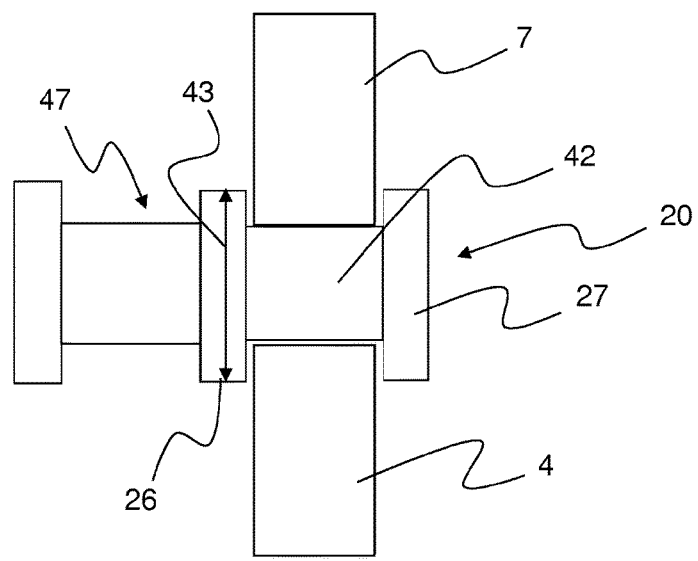
Fig. 1
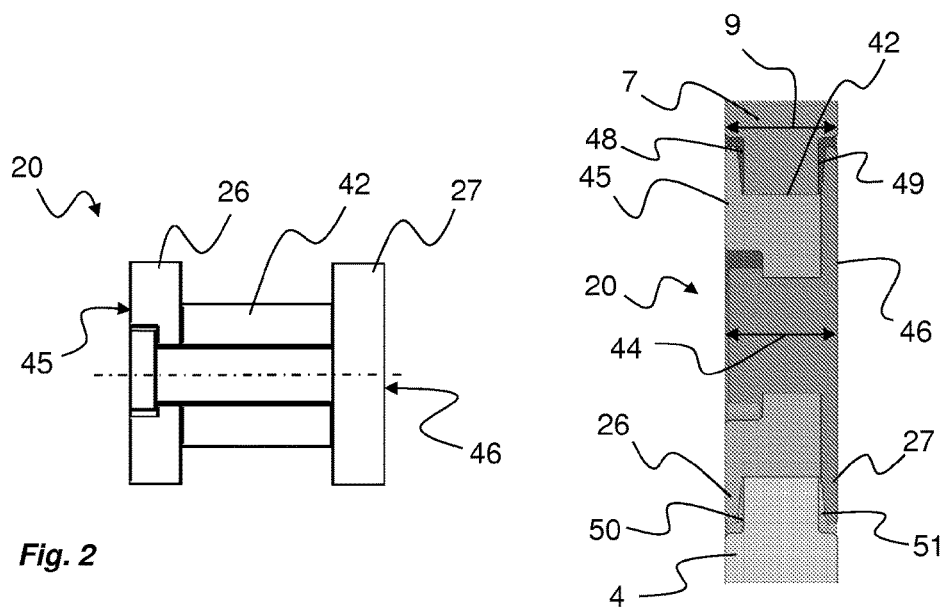
Fig. 2
Fig. 3

ROLLER FOR A PENDULUM MASS OF A CENTRIFUGAL FORCE PENDULUM

The present invention relates to a roller for a pendulum mass of a centrifugal pendulum for a motor vehicle, preferably with an internal combustion engine, as well as a friction clutch and a motor vehicle with a centrifugal pendulum. In friction clutches, a centrifugal pendulum is used to suppress the transmission of undesirable vibrations, which generally originate from the internal combustion engine, to the driven system in predetermined frequency ranges.

BACKGROUND

In the prior art, a centrifugal pendulum is provided in the form of a flywheel and a plurality of pendulum masses, the pendulum masses being movably suspended in such a way that they absorb the vibrations that occur in a special resonance range. For this purpose, a flywheel has previously been used to which the plurality of pendulum masses were attached laterally, e.g., with the aid of rivets. On conventional friction clutches for motor vehicles, the individual pendulum masses are approximately 3 mm deep, as is the corresponding flywheel, so that with the gaps provided for unrestricted mobility the total depth adds up to approximately 10 mm. A system of this type has disadvantages in particular for friction clutches for small vehicles, because in small vehicles the components must have particularly small dimensions.

SUMMARY OF THE INVENTION

The present invention provides a roller for a pendulum mass of a centrifugal pendulum that has a rolling section and a first retaining section and a second retaining section, the retaining sections having a larger diameter than the rolling section and the roller has a width that is smaller than or as large as a first depth of the centrifugal pendulum.

The roller is designed to be situated between a pendulum mass and the bearing surface of a flywheel of the centrifugal pendulum, so that the pendulum mass carries out a predefined absorption movement as the result of an incoming vibration. The pendulum mass thereby rolls off via the rolling section of the roller. The retaining sections with their larger diameter and the pendulum mass are guided laterally, i.e., axially, so that the pendulum mass is held in the flywheel. These retaining sections may also be called rims. Two (or more) rollers are generally used for each pendulum mass. At least one bevel is advantageously provided on the flywheel and/or on the at least one pendulum mass, into which at least one of the retaining sections is retractable in such a way that the total depth of the centrifugal pendulum equals the first depth, i.e., the maximum thickness. Therefore the total depth is not increased by the axial extension of the roller(s). As a result of the use of the roller, no additional axial fastening for the pendulum mass is necessary.

According to one additional advantageous specific embodiment, the roller is configured in two parts and the first retaining section forms a single piece with a first part of the roller and the second retaining section forms a single piece with a second part of the roller.

As a result of this two-part configuration a particularly narrow configuration may be achieved. In particular in situations where very little space is available, the two-part specific embodiment may facilitate the assembly, for example by using a blind rivet to connect the two parts, and only one side of the roller needs to be accessed for the fastening of the blind rivet.

According to one additional advantageous specific embodiment, the roller is configured as one piece.

This one-piece configuration makes it possible to manufacture the roller particularly simply and economically. The roller may also be mounted very easily as a result of an insertion opening in the pendulum mass and/or flywheel. In another variant of the centrifugal pendulum, at least one of the retaining sections is put in place only after the assembly. Thereby an insertion opening may be dispensed with.

According to one additional advantageous specific embodiment, the roller is connectable to at least one additional roller, preferably of the same design, during the fitting in a centrifugal pendulum.

For centrifugal pendulums with a plurality of pendulum masses arranged in parallel, a roller that is connectable to one (or two) neighboring rollers may be particularly well suited. The connection may be designed to be integrally bonded, form-locked or force-fitted, where particular preference is given to a connection not detachable without damage, such as, for example, a press fit or a rivet that penetrates multiple rollers.

According to one additional aspect of the present invention, a centrifugal pendulum is provided for a motor vehicle, preferably one with an internal combustion engine, that has at least one pendulum mass and one flywheel with an oscillation axis, having a first depth and two lateral surfaces, the flywheel having, in at least one of the surfaces, at least one opening in which at least one pendulum mass may be movably arranged so that it is secured in place axially.

In particular, a roller according to the present invention as described in this document may be used in the centrifugal pendulum according to the present invention. The centrifugal pendulum is suitable in particular for use in motor vehicles with an internal combustion engine to isolate the inevitably occurring vibrations, originating from the internal combustion engine, from the motor vehicle drive system. Not only is the comfort level for the user of the vehicle improved, but the components situated downstream in the drive train are also protected. The at least one pendulum mass is movably fastened to the flywheel, so that it is axially secured and may vibrate in the plane normal to the oscillation axis along a predetermined curve. The oscillation axis is thereby the axis of rotation of the friction clutch, so that the flywheel rotates around the axis of rotation of the friction clutch. The flywheel thereby has a depth, for example, of 3 mm in the axial direction. The depth is delimited by the two lateral surfaces of the flywheel. The flywheel also has, on at least one of the two surfaces, an opening into which the at least one pendulum mass may be inserted. The opening is designed in such a way that the pendulum mass may carry out the intended movement in the plane. The fact that the pendulum mass is situated in the opening results in a reduction of the overall depth of the centrifugal pendulum.

According to one advantageous specific embodiment of the centrifugal pendulum, the opening penetrates the flywheel axially through both surfaces, in particular a pendulum mass situated in the opening having a second depth which is less than or equal to the first depth of the flywheel, so that the pendulum mass situated in the opening is in maximum contact on both sides with the two surfaces of the flywheel.

According to this advantageous specific embodiment of the centrifugal pendulum, the opening is not simply a depression in the flywheel, but penetrates all the way through the flywheel in the axial direction. In this specific embodiment, the at least one pendulum mass may be situated in the opening in such a way that the total depth of the centrifugal pendulum is reduced further. The at least one pendulum mass advantageously has a second depth which is less than or equal to the first depth of the flywheel, so that the at least one pendulum mass does not project beyond the surfaces of the flywheel. On a 4-mm deep flywheel, for example, the total depth of the arrangement of flywheel and pendulum mass would not be greater than 4 mm.

According to one advantageous specific embodiment of the centrifugal pendulum, a pendulum mass forms a plurality of first stops and the flywheel for the pendulum mass forms a corresponding number of second stops, at least one roller being situated between the first stops and the second stops, respectively.

The first and second stops are situated in the radial direction of the centrifugal pendulum and face one another. In particular and by design, the stops for a specific frequency have design-specific curved contact surfaces that force an absorption oscillation of the pendulum mass with the aid of the rollers. In particular, an individual pendulum mass oscillates both around its own center of gravity as well as around the oscillation axis of the centrifugal pendulum. In particular, the at least one opening is in the form of a radial indentation which on the outside of the flywheel forms a narrowed mouth as a result of the formation of the first stops. The opening therefore opens outwardly toward the radius.

According to one advantageous specific embodiment of the centrifugal pendulum, a retaining plate that secures the pendulum mass on the flywheel in at least one axial direction is situated on at least one side of a pendulum mass.

As a result of the arrangement of a retaining plate on one side of the pendulum mass, the pendulum mass may be secured axially in one direction on the flywheel. Retaining plates are advantageously provided on both sides of the pendulum mass that axially secure the pendulum mass on both sides on the flywheel. These retaining plates also increase the total flywheel mass of the centrifugal pendulum.

According to one advantageous specific embodiment of the centrifugal pendulum, the flywheel provides an axial fixing of the at least one pendulum mass; at least a part of the fixing is formed in particular by a sheet metal disk situated on the flywheel.

In this specific embodiment, the pendulum mass is secured on at least one side and preferably on both sides in the opening of the flywheel. The safeguard may take the form of a closure of the opening on one side or both sides with the aid of a sheet metal disk. This arrangement, for example, has the advantage that the flywheel with its newly formed surface may be used as a friction surface, for example, in a friction clutch.

According to one advantageous specific embodiment of the centrifugal pendulum, the rollers are fastened to the at least one retaining plate.

In this advantageous specific embodiment of the centrifugal pendulum, the rollers are fastened on the at least one retaining plate which is situated on the pendulum mass and secures it axially on at least one side. The rollers may therefore be situated on a fixed axis or alternatively freely movable between the stops.

According to one additional advantageous specific embodiment of the centrifugal pendulum, at least one of the pendulum masses is movably mounted with the aid of a roller as described above and is simultaneously axially secured in place.

The roller described above makes a particularly thin configuration possible because additional retaining means may be dispensed with. The flywheel and/or at least one of the pendulum masses is/are particularly advantageously provided with a bevel so that at least one of the retaining sections may be recessed in the first depth of the flywheel and does not project beyond the lateral surface of the flywheel.

In an additional advantageous specific embodiment, the rollers are secured between two retaining plates which are situated on both sides of the pendulum mass and secure it axially on both sides. The stability of the pendulum mass with the retaining plates is thereby increased and the constructive arrangement of the rollers is facilitated.

In an additional advantageous specific embodiment of the centrifugal pendulum, the rollers are manufactured by sheet metal stamping. The rollers manufactured by sheet metal stamping are particularly economical. In one particularly preferred specific embodiment, the rollers are manufactured by sheet metal stamping of the retaining plates on the pendulum mass. The number of components is thereby reduced and the assembly process is facilitated.

According to another aspect of the present invention, a friction clutch for the detachable connection of an output shaft with a drive train is provided that has at least the following components:
  at least one pressure plate;
  a central web;
  at least one clutch disk;
  at least one two-mass flywheel, at least one of the components listed above including a centrifugal pendulum as per above.

The centrifugal pendulum provided here may be used in different components of a drive train. It may thereby replace a separate component such as a two-mass flywheel, for example, or be integrated into one of the components named above. For the detachable connection of a drive shaft with a drive train with the aid of the friction clutch, a friction assembly is provided in the friction clutch which includes at least one pressure plate and at least one corresponding clutch disk. The pressure plate may be pressed against the clutch disk, as a result of which a friction force is generated. The friction force makes it possible to transmit a torque from the pressure plate to the clutch disk and vice-versa. To smooth out the resulting vibrations, a two-mass flywheel is frequently provided that has two masses that oscillate in different directions. In a friction clutch that is in the form of a double clutch, a central web is provided which represents a pressure plate for two independent friction assemblies. All these potential components of a friction clutch have in common the fact that they at least sometimes carry out the rotation of the friction clutch, and are therefore basically suitable for use as a flywheel. A friction clutch of this type may therefore be made very flat and, on account of the integrated centrifugal pendulum, may simultaneously have very good vibration isolation properties.

With the centrifugal pendulum described above, it is possible to integrate the function of the centrifugal pendulum into at least one of these components without any adverse effect on their respective principal functions. Nor do the components have to be made significantly larger, because the provided centrifugal pendulum has a particularly flat total depth.

According to yet another additional aspect of the present invention, a motor vehicle is provided that has a drive unit including an output shaft, a drive train and a friction clutch as described above, in particular the drive unit being situated in the motor vehicle forward of a driver's compartment and transverse to a longitudinal axis of the motor vehicle.

Nowadays, most motor vehicles have front-wheel drive and therefore place the drive unit, such as an internal combustion engine or an electric motor, for example, forward of the driver's compartment and transverse to the principal direction of travel. With such an arrangement, the space requirement is particularly low and it is therefore particularly advantageous to use a small clutch.

The installation space situation is more pronounced in passenger cars of the small-car segment according to European classification. The power plants in a passenger car of the small-car segment are essentially not made smaller compared to passenger cars of the larger car segment. However, the available installation space in the case of small cars is essentially smaller. The centrifugal pendulum described above is particularly well-suited for use in small clutches because the amount of installation space required is only slightly larger or not at all larger than a friction clutch without a centrifugal pendulum. Passenger cars are assigned to a vehicle class on the basis of factors such as size, price, weight and engine power, for example, this definition being constantly subjected to change depending on the needs of the market. In the US market, vehicles in the small-car segment and mini-car segment according to the European classification are called subcompact cars, and in the British market they correspond to the supermini or "city car" segment. Examples of mini-car segments are a Volkswagen Fox or a Renault Twingo. Examples of the small-car segment include the Alfa Romeo Mito, Volkswagen Polo, Ford Fiesta or Renault Clio.

The features described individually in the patent claims may be combined with one another in any technologically appropriate manner and may be supplemented by situations explained in the description and details from the accompanying figures, additional variants of the present invention also being illustrated.

BRIEF DESCRIPTION OF THE DRAWINGS

The present invention and the technical field are explained in greater detail below with reference to the accompanying figures. The figures illustrate particularly preferred exemplary embodiments to which the present invention is not limited. In particular, it should be noted that the accompanying figures and in particular the illustrated scales are only schematic.

FIG. 1 shows a one-piece roller with retaining sections connected to an additional roller;

FIG. 2 shows a two-piece roller;

FIG. 3 shows a two-piece roller installed in a beveled centrifugal pendulum;

DETAILED DESCRIPTION

Figure 4:
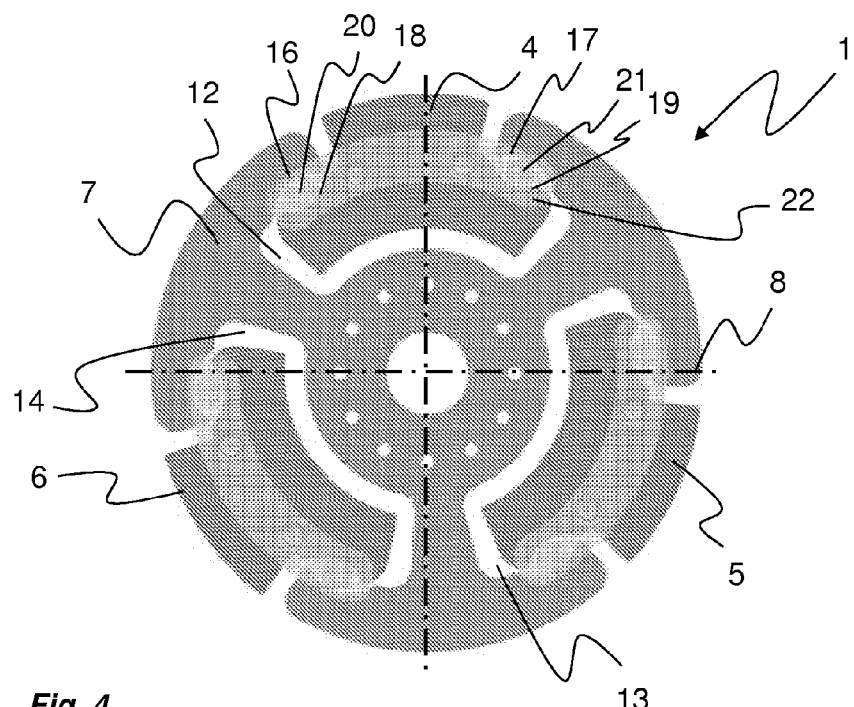
FIG. 4 shows a centrifugal pendulum with openings open to the outside.

FIG. 1 shows a one-piece roller 20 which is situated between a flywheel 7 and a pendulum mass 4. Rolling section 42 makes an absorption movement of the pendulum mass 4 possible. Pendulum mass 4 is axially secured on flywheel 7 with the aid of first retaining section 26 and second retaining section 27. Diameter 43 of retaining sections 26, 27 is enlarged with respect to rolling section 42. In this case, roller 20 is connected to an additional roller 47.

FIG. 2 shows a two-piece roller 20, first retaining section 26 being formed in one piece with first part 45 and second retaining section 27 and rolling section 42 being formed in one piece with second part 46. In this case roller 20 has a form-fitted joint by way of a rivet, for example.

FIG. 3 shows an additional two-piece roller 20 which is situated between a flywheel 7 and a pendulum mass 4. The rest of the configuration is similar to the configuration illustrated in FIG. 2. In this case, a first bevel 48 and a second bevel 49 are provided on flywheel 7 and likewise a first bevel 50 and a second bevel 51 are provided on pendulum mass 4 so that roller 20 has a width 44 which is less than or equal to first depth 9 of flywheel 7.

FIG. 4 shows a centrifugal pendulum 1 having a first opening 12, a second opening 13 and a third opening 14, which are open radially outside oscillation axis 8 in the manner of an indentation. A first pendulum mass 4, a second pendulum mass 5 and a third pendulum mass 6 are situated in openings 12, 13, 14. The respective pendulum masses 4, 5, 6 are supported with the aid of a left first stop 16 and a right first stop 17 via a first roller 20 and a second roller 21 and corresponding left second stops 18 and right second stops 19. The pendulum masses 4, 5, 6 are axially secured with the aid of retaining plate 22.

Figure 5:
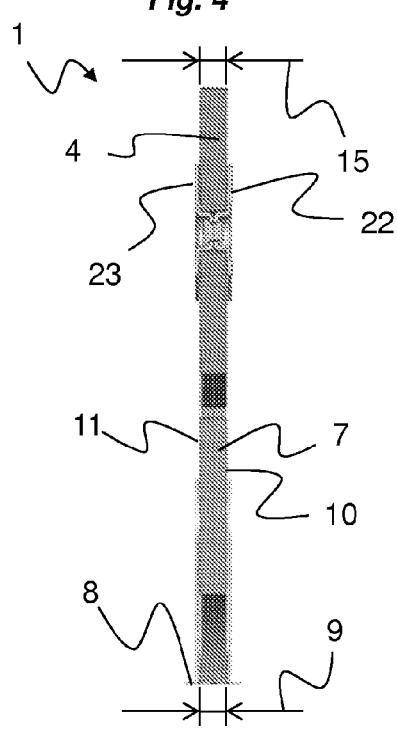
FIG. 5 shows a centrifugal pendulum in cross section.

FIG. 5 shows a side view of a centrifugal pendulum 1 in cross-section, whereby it is apparent that first depth 9 of flywheel 7 equals second depth 15 of pendulum mass 4. First pendulum mass 4 does not project beyond first surface 10 or second surface 11, but ends flush with these surfaces. First retaining plate 22 and second retaining plate 23 are apparent, which are riveted to each other on pendulum mass 4 and secure pendulum mass 4 axially.

Figure 6:
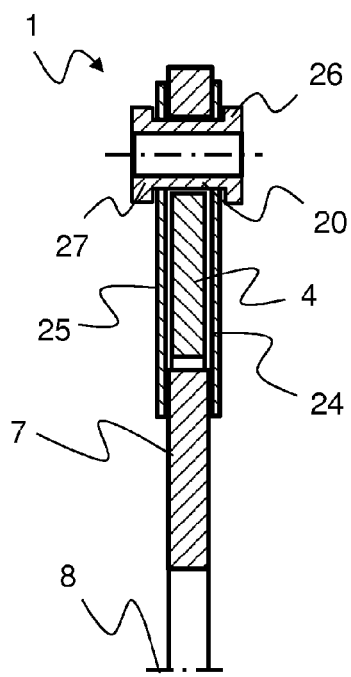
FIG. 6 shows a centrifugal pendulum in cross section including the rollers with rims.

FIG. 6 shows a section through a centrifugal pendulum 1, a first roller 20 being secured with the aid of a first fixing 24 and a second fixing 25 axially with a first rim 26 and a second rim 27. First pendulum mass 4 rolls off over first roller 20 and is axially secured by first and second fixings 24, 25, which are made of sheet metal and are permanently connected to flywheel 7.

Figure 7:
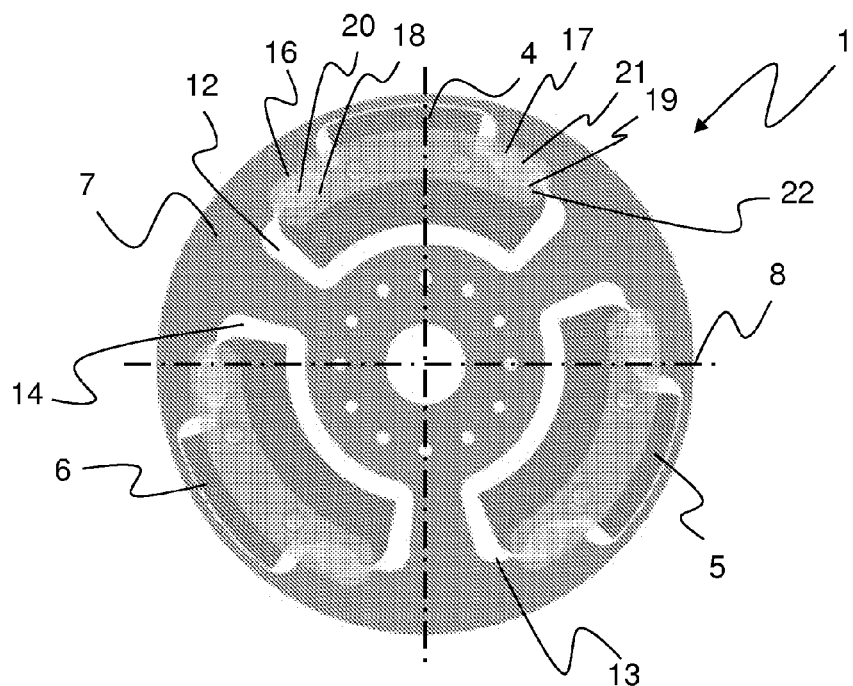
FIG. 7 shows a centrifugal pendulum with closed openings.
Figure 8:
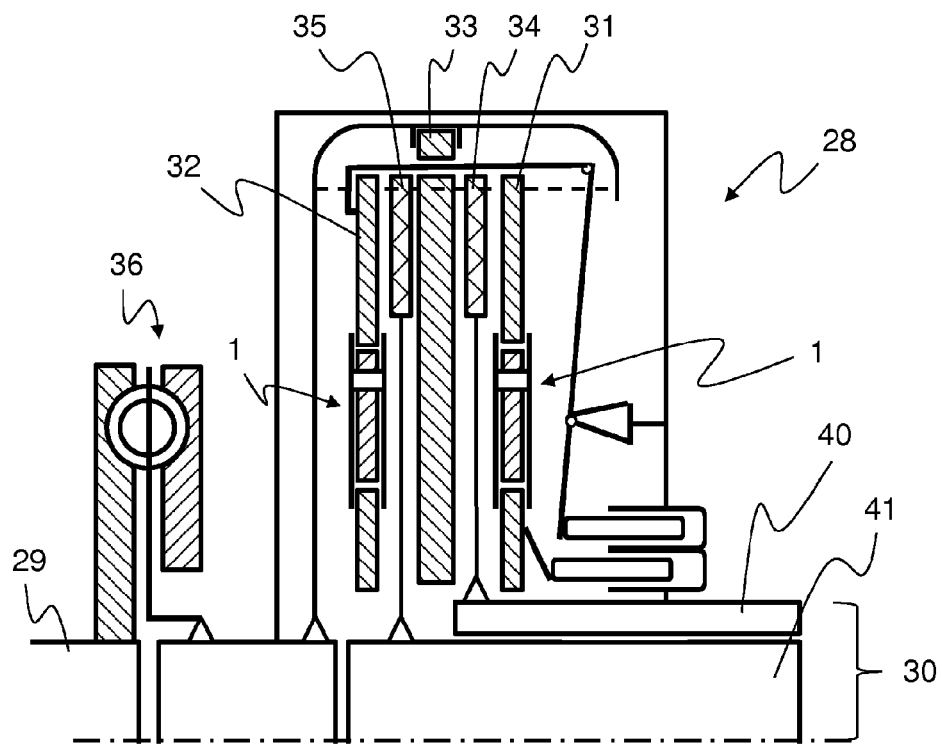
FIG. 8 shows a friction clutch including centrifugal pendulums.

FIG. 7 shows an arrangement of a centrifugal pendulum 1 similar to that illustrated in FIG. 4, in this specific embodiment openings 12, 13, 14 being closed toward the outside. FIG. 8 shows a friction clutch 28 in which an output shaft 29 is detachably connectable to a drive train 30. Friction clutch 28 is in this case in the form of a dual clutch including a first output shaft 40 and a second output shaft 41 which form a part of drive train 30. For this purpose first pressure plate 31 may be pressed toward central web 33, whereby first clutch disk 34 is clamped. A torque is therefore transmittable from output shaft 29 to first output shaft 40. Likewise a torque is transmittable via second pressure plate 32, second clutch disk 35 and central web 33 to second output shaft 41. Output shaft 29 has a two-mass flywheel 36. First pressure plate 31 and second pressure plate 32 are each in the form of a centrifugal pendulum 1 as described above.

Figure 9:
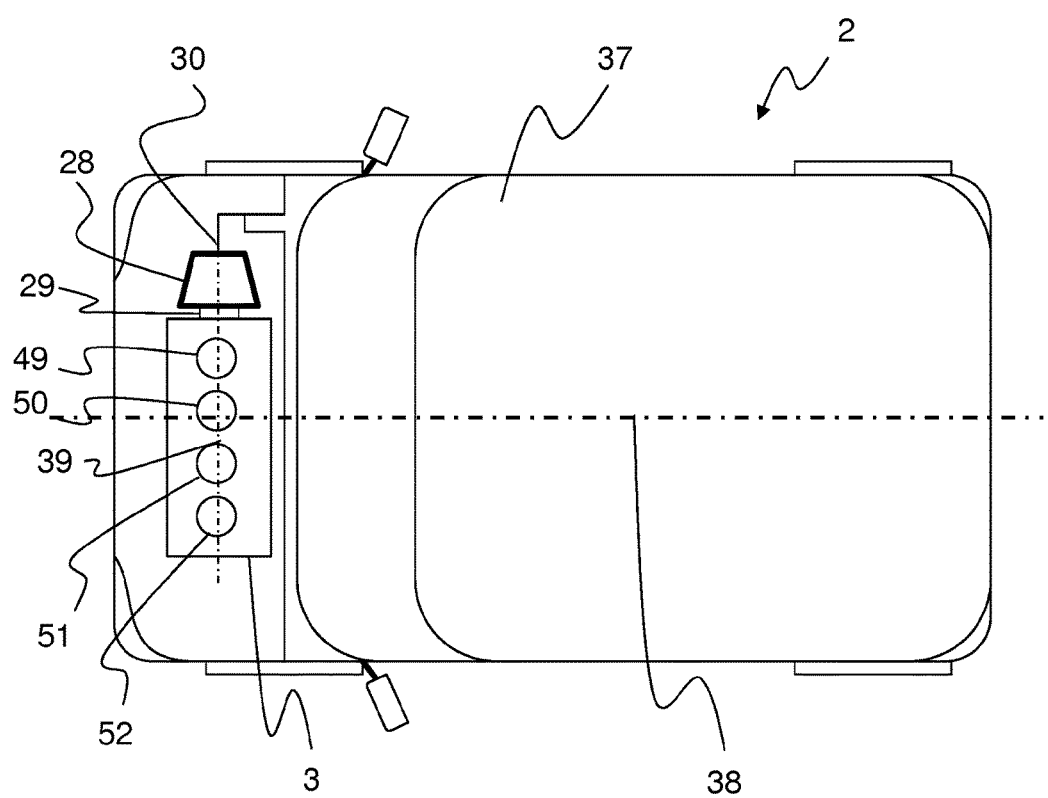
FIG. 9 shows a motor vehicle including a friction clutch.

FIG. 9 shows a motor vehicle 2 including an internal combustion engine 3, output shaft 29 of internal combustion engine 3 being detachably connectable with the aid of a friction clutch 28 to drive train 30 which is shown only schematically. Internal combustion engine 3 is oriented with its engine axis 39 transverse to longitudinal axis 38 of motor vehicle 2 and is situated forward of driver's compartment 37.

With the roller provided here, a centrifugal pendulum for particularly flat clutches may be constructed. In particular, the total weight of the friction clutch is also reduced and assembly is facilitated.

LIST OF REFERENCE NUMERALS

1 Centrifugal pendulum
2 Motor vehicle
3 Internal combustion engine
4 First pendulum mass
5 Second pendulum mass
6 Third pendulum mass
7 Flywheel
8 Oscillation axis
9 First depth
10 First surface
11 Second surface
12 First opening
13 Second opening
14 Third opening
15 Second depth
16 Left first stop
17 Right first stop
18 Left second stop
19 Right second stop
20 First roller
21 Second roller
22 First retaining plate
23 Second retaining plate
24 First axial fixing
25 Second axial fixing
26 First retaining section
27 Second retaining section
28 Friction clutch
29 Output shaft
30 Drive train
31 First pressure plate
32 Second pressure plate
33 Central web
34 First clutch disk
35 Second clutch disk
36 Two-mass flywheel
37 Driver's compartment
38 Longitudinal axis
39 Engine axis
40 First output shaft
41 Second output shaft
42 Rolling section
43 Diameter
44 Width
45 First part
46 Second part
47 Additional roller
48 First bevel of the flywheel
49 Second bevel of the flywheel
50 First bevel of the pendulum mass
51 Second bevel of the pendulum mass

What is claimed is:

1. A centrifugal pendulum for a motor vehicle including an internal combustion engine, the centrifugal pendulum comprising:
    at least one pendulum mass; and
    a flywheel including an oscillation axis with a first depth and including two lateral surfaces, the flywheel having in at least one of the lateral surfaces at least one opening, the at least one pendulum mass axially movable in the at least one opening; wherein the flywheel provides an axial fixing of the at least one pendulum mass; wherein at least a part of the fixing being formed by a sheet metal disk situated on the flywheel.

2. The centrifugal pendulum as recited in claim 1 wherein the opening axially penetrates the flywheel through both lateral surfaces.

3. The centrifugal pendulum as recited in claim 2 wherein the pendulum mass situated in the opening has a second depth equal to or less than the first depth of the flywheel, so that the pendulum mass situated in the opening is in maximum contact on both sides with the two lateral surfaces of the flywheel.

4. The centrifugal pendulum as recited in claim 1 wherein the pendulum mass forms a plurality of first stops and the flywheel forms a corresponding number of second stops, and further comprising at least one roller being situated between each of the first stops and the second stops.

5. The centrifugal pendulum as recited in claim 1 further comprising a retaining plate situated on at least one side of a pendulum mass and securing the pendulum mass in at least one axial direction on the flywheel.

6. The centrifugal pendulum as recited in claim 5 further comprising two rollers secured on the at least one retaining plate.

7. The centrifugal pendulum as recited in claim 1 further comprising rollers manufactured by sheet metal stamping.

8. A friction clutch for a detachable connection of an output shaft to a drive train, the friction clutch comprising at least one of the following components:
    at least one pressure plate;
    a central web;
    at least one clutch disk; and
    at least one two-mass flywheel;
    at least one of the components listed above including the centrifugal pendulum as recited in claim 1.

9. A motor vehicle comprising:
    an internal combustion engine including the output shaft, the drive train, and the friction clutch for the detachable connection of the output shaft to the drive train as recited in claim 8.

10. The motor vehicle as recited in claim 9 wherein the internal combustion engine is situated forward of a driver's compartment and transverse to a longitudinal axis of the motor vehicle.

* * * * *